(12) United States Patent
Homan et al.

(10) Patent No.: US 7,414,391 B2
(45) Date of Patent: Aug. 19, 2008

(54) ELECTROMAGNETIC LOGGING TOOL CALIBRATION SYSTEM

(75) Inventors: Dean M. Homan, Sugar Land, TX (US); Richard A. Rosthal, Houston, TX (US); Gerald N. Minerbo, Missouri City, TX (US); Thomas D. Barber, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 458 days.

(21) Appl. No.: 10/616,710

(22) Filed: Jul. 10, 2003

(65) Prior Publication Data

US 2004/0113609 A1 Jun. 17, 2004

Related U.S. Application Data

(60) Provisional application No. 60/399,606, filed on Jul. 30, 2002.

(51) Int. Cl.
*G01R 35/00* (2006.01)
*G01R 33/00* (2006.01)
*G01V 3/10* (2006.01)
*G01V 1/40* (2006.01)

(52) U.S. Cl. .................. 324/202; 324/225; 324/339; 702/7

(58) Field of Classification Search .......... 324/202, 324/338, 339, 343, 333, 346, 224, 225; 702/7, 702/11, 13
See application file for complete search history.

(56) References Cited

U.S. PATENT DOCUMENTS

| | | | |
|---|---|---|---|
| 2,519,094 A * | 8/1950 | Zuschlag | 324/257 |
| 4,119,847 A | 10/1978 | Waggoner | |
| 4,338,664 A * | 7/1982 | Mayer | 702/11 |
| 4,409,480 A | 10/1983 | Givens | |
| 4,439,831 A | 3/1984 | Sinclair | |
| 4,876,511 A | 10/1989 | Clark | |
| 4,945,233 A | 7/1990 | Jorro | |
| 5,159,577 A * | 10/1992 | Twist | 367/25 |
| 5,293,128 A | 3/1994 | Zhou | |
| 6,218,842 B1 * | 4/2001 | Bittar et al. | 324/339 |
| 6,308,136 B1 * | 10/2001 | Tabarovsky et al. | 702/7 |

(Continued)

FOREIGN PATENT DOCUMENTS

EP 0648342 7/1993

(Continued)

*Primary Examiner*—Patrick Assouad
*Assistant Examiner*—David M. Schindler
(74) *Attorney, Agent, or Firm*—Bryan L. White; Darla Fonseca; Dale Gaudier

(57) ABSTRACT

Techniques for calibrating an electromagnetic logging tool equipped with a plurality of antennas, with at least one antenna having its axis at an angle with respect to a tool axis, include disposing a test loop about the tool such that an axis of the tool and a plane on which the test loop lies form a tilt angle that is between about 0 and 90 degrees. An induced signal is measured at one of the antennas by energizing another of the antennas. Embodiments analyze the induced signal corresponding to a max or min extrema associated with a coupling effect due to the test loop. In other embodiments a corrected signal is compared with a calculated signal.

35 Claims, 8 Drawing Sheets

U.S. PATENT DOCUMENTS

| | | | |
|---|---|---|---|
| 6,393,364 B1 * | 5/2002 | Gao et al. | 324/339 |
| 6,476,609 B1 * | 11/2002 | Bittar | 324/338 |
| 6,534,985 B2 * | 3/2003 | Holladay et al. | 324/334 |
| 2001/0038287 A1 * | 11/2001 | Amini | 324/341 |

FOREIGN PATENT DOCUMENTS

| | | |
|---|---|---|
| EP | 0648342 B1 * | 12/1997 |
| GB | 2224123 | 10/1989 |
| GB | 2236592 | 9/1990 |

* cited by examiner

ELECTROMAGNETIC LOGGING TOOL CALIBRATION SYSTEM

CROSS-REFERENCE TO RELATED APPLICATIONS

This invention claims priority pursuant to 35 U.S.C. § 119 of U.S. Provisional Patent Application Ser. No. 60/399,606, filed on Jul. 30, 2002. This Provisional Application is hereby incorporated by reference in its entirety.

BACKGROUND OF INVENTION

1. Field of the Invention

The invention relates to techniques for testing and calibrating electromagnetic logging instruments adapted for subsurface measurements.

2. Background Art

Various well logging techniques are known in the field of hydrocarbon and water exploration and production. These techniques typically use instruments or tools equipped with sources adapted to emit energy into a subsurface formation that has been penetrated by a borehole. The emitted energy interacts with the surrounding formation to produce signals that are then detected and measured by one or more sensors on the instrument. By processing the detected signals, or profile of the formation properties is obtained.

Electromagnetic (EM) induction and propagation logging are well-known techniques. In this description an EM tool or EM logging tool is generally used to refer to either an induction or propagation-type tool because the present invention is applicable to both types. An EM logging tool is typically disposed within the borehole to measure the electrical conductivity (or its inverse, resistivity) of subsurface formations. A typical EM tool includes a transmitter antenna and one or more (typically a pair) receiver antennas disposed on the tool.

Antennas (or coils) may be operable as sources and/or sensors. For clarity, an EM logging tool in this description is described as having a certain transmitter-receiver configuration as if there were two distinct types of antennas—transmitter and receiver antennas. However, the principle of reciprocity applies, and one skilled in the art will appreciate that a transmitter and a receiver have similar physical/electrical characteristics and one can substitute for the other.

In both wireline and LWD applications, the antennas are mounted on the support member (mandrel or sonde) and axially spaced from each other along the longitudinal axis of the tool. These antennas are generally coils of the cylindrical solenoid type and are comprised of one or more turns of insulated conductor wire that is wound around the support member. In operations, the transmitter antennas is energized by an alternating current to emit EM energy through the borehole fluid (also referred to as "mud") and into the formation. The signals detected at the receiver antenna(s) are usually expressed as a complex number (phasor voltage) and reflect interaction with the mud and the formation.

A coil carrying a current (e.g., a transmitter coil) generates a magnetic field that can be represented as a magnetic dipole having a magnetic moment proportional to the current and the area of the coil. The direction and strength of the magnetic dipole can be represented as a vector perpendicular to the plane of the coil. The magnetic moment from the transmitter antenna is transmitted into the surrounding formation, which induces a current (eddy current) flowering in the formation around the transmitter. The eddy current in the formation in turn generates an magnetic field that induces an electrical voltage in the receiver antennas.

In conventional EM logging tools, the transmitter and receiver antennas are typically mounted with their axes aligned with the longitudinal axis of the instrument, i.e., these tools have longitudinal magnetic dipoles (LMD). When an LMD-equipped tool is placed in a borehole and the antenna is energized to transmit EM energy, eddy currents flow in loops in the surrounding formation in planes perpendicular to the borehole and there is no current flow up or down the borehole so long as the formation is axially symmetric about the tool axis.

An emerging technique in the field of well logging is the use of instruments incorporating tilted or transverse (at 90 degrees to the support axis) antennas, i.e., where the antenna's axis or magnetic moment is not parallel to the support axis. These instruments are thus implemented with antennas having a transverse or tilted magnetic dipole (TMD). One particular implementation uses a set of three coils having nonparallel axis (also referred to as "tri-axial"). The TMD antenna configuration can induce eddy currents in planes not perpendicular to the borehole and, thus, can provide EM measurements with direct sensitivity and sensitivity to the anisotropic resistivity properties of the formation. Logging instruments having TDMs are described in U.S. Pat. No. 6,163,155, 6,147,496, 5,115,198, 4,319,191, 5,508,616, 5,757,191, 5,781,436, 6,044,325, and 6,147,496.

Tool calibration is an important and necessary task of logging operations. Factors such as imperfections in tool construction and variations due to the tool's electronics (e.g., op-amp phase accumulations) will inevitably introduce errors in the measurements. Tool calibration provides a way to eliminate or compensate for the effects of these factors on the measurements data. Several methods are available for calibrating conventional LMD logging tools. For example, U.S. Pat. No. 4,876,511 discloses an external testing apparatus for testing and correcting an EM logging tool. This apparatus includes a shielded receiving devices that clamps around the transmitting antenna to intercept the transmitted signal and a shielded transmitting device that is positioned around the receiving antennas of the tool to transmit a signal which has a phase and/or amplitude related to the signal transmitted by the tool's transmitting antenna. This device simulates the effect that a geological formation would have on the signal if it were to travel from the tool's transmitting antenna through the formation. Because the simulated effect is known, the output of the tool may be verified or it may be corrected if necessary.

Other methods use conductive loops to calibrate the tool. When a transmitter is activated to emit EM energy, it induces an eddy current in the conductive loop. The eddy current in the conductive loop in turn induces an EM response to the receiver with an intensity that is a function of the eddy current magnitude. The measured signals are then used to calibrate the tool. Conventional conductive testing loops have magnetic dipoles oriented along the tool (z-oriented) axis to couple with LMD antennas only. U.S. Pat. No. 5,293,128 describes such as technique for calibrating an EM tool.

All of these methods are for the calibration of conventional LMD EM tools. With the advent of TMD-type logging tools with multiple antennas, however, calibration procedures require more complex measurements. TMD antenna configurations produce multiple couplings in multiple directions between transmitters and receivers. Thus a need exists for techniques to calibrate tools equipped with TMD antennas.

SUMMARY

One aspect of the invention relates to a method for calibrating an electromagnetic logging tool having a plurality of antennas disposed thereon with at least one antenna having its axis at an angle with respect to the axis of the tool, each antenna adapted to transmit and/or receive electromagnetic energy. The method includes disposing a test loop about the electromagnetic logging tool such that the axis of the tool and a plane on which the test loop lies form a tilt angle that is between about 0 and 90 degrees; measuring a signal induced in one of the antennas when another of the antennas is energized, the induced signal being affected by the test loop; and determining a correction for the induced signal.

Another aspect of the invention relates to a system for calibrating an electromagnetic logging tool. The system includes a plurality of antennas disposed on the logging tool with at least one antenna having its axis at an angle with respect to the axis of the tool, each antennas adapted to transmit and/or receiver electromagnetic energy; a test loop adapted for disposal about the logging tool such that the axis of the tool and a plane on which the test loop lies form a tilt angle that is between about 0 and 90 degrees; and a process or adapted to calculate a correction for a signal induced in one of the antennas by another of the antennas, the induced signal being affected by the test loop.

Another aspect of the invention relates to a system for calibrating an electromagnetic logging tool having a plurality of antennas disposed thereon with at least one antenna having its axis at an angle with respect to the axis of the tool, each antenna adapted to transmit and/or receiver electromagnetic energy. The system includes a test loop adapted for disposal about the logging tool such that the axis of the tool and a plane on which the test loop lies form a tilt angle that is between about 0 and 90 degrees. The system also includes a computer adapted to connect to the electromagnetic logging tool, wherein the computer is adapted to process a program with instructions to perform: energizing a first antenna on the tool in the presence of the test loop; measuring an induced signal at a second antenna on the tool; and determining a correction for the induced signal.

Other aspects and advantages of the invention will be apparent from the following description and the appended claims.

DETAILED DESCRIPTION

The present invention relates to techniques for testing and calibrating EM logging tools or instruments equipped with TMD antennas. Embodiments of the invention are capable of calibrating all elements in a trans-impedance matrix that defines various couplings between transmitter and receiver antennas in a TMD EM tool.

Figure 1:
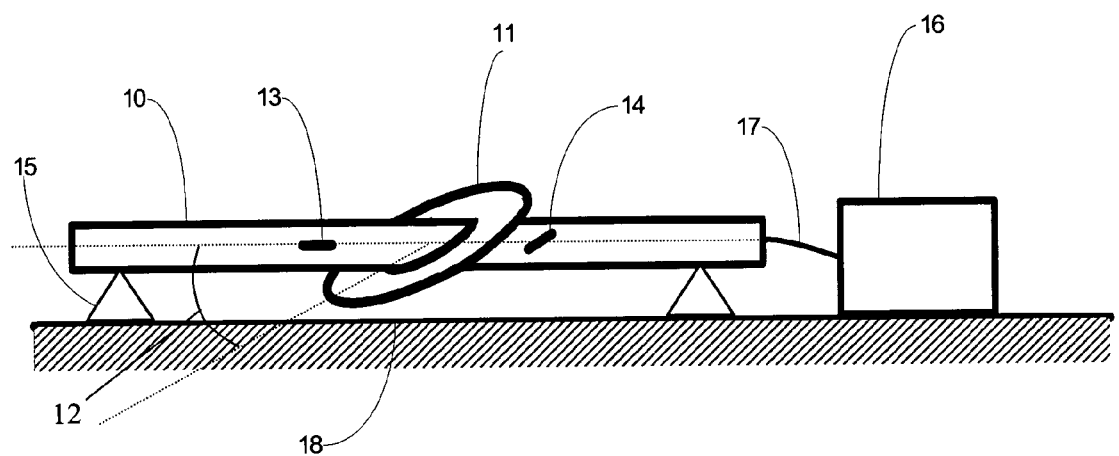
FIG. 1 is an illustration of a logging tool with a test loop disposed about the tool axis for calibration/testing in accord with the invention.

FIG. 1 illustrates a setup for calibrating a logging tool according to one embodiment of the invention. A tilted test loop (TTL) 11 is shown disposed on an EM logging tool 10, which may be a wireline, MWD, LWD, or any other conventional logging instruments. The tool 10 is shown equipped with a transmitter antenna 13 and a receiver antenna 14. A cable 17 connects the EM logging tool 10 with a computer (or processor unit) 16, which allows for recording and/or processing of data.

As shown, the TTL 11 lies in a plane (not shown) that intercepts the tool 10 at a tilt angle 12. Due to this arrangement, the magnetic dipole of the TTL 11 would have a magnetic moment oriented in a direction not coincident with the tool 10 axis (shown as a dashed line). The tilt angle 12 made by the TTL 11 with the tool axis can be selected to provide optimal coupling between the TTL 11, the transmitter antenna 13, and the receiver antenna 14. Those skilled in the art will appreciate that an optimal tilt angle is dependent on the antenna 13, 14 configurations (tilted or transverse). For a typical tri-axial EM tool, which has mutually orthogonal transverse antennas, an optimal tilt angle is found around 45 degrees. For EM tools having tilted antennas (see e.g., FIG. 3A and tool 10' with antennas 14', 13'), the optimal tilt angles may be larger or smaller than 45 degrees. Embodiments of the invention may use a tilt angle from about 0 to 90 degrees.

The size and shape of the TTL 11 is variable and may be selected to optimize the coupling between the transmitter antenna 13 and the receiver antenna 14. In one embodiment, the TTL 11 is formed on the surface of a cylinder adapted to remain concentric with the tool axis when placed on the tool 10. The size of the TTL 11 can be commensurate with the separation between the transmitter antenna 13 and the receiver antenna 14. With a larger separation between the antennas, it may be preferred to have a larger TTL 11, while with a smaller separation between the antennas, a smaller TTL 11 is more suitable. It is also possible (and sometimes more convenient) to use a single sized TTL to calibrate tools with various transmitter-receiver separations. In this case, it is preferred to have a TTL with a larger diameter because a larger TTL works well with both large and small separations between the transmitter and the receiver. One skilled in the art will appreciate that various sizes and shapes for the TTL 11 may be used to implement the invention.

Figure 2:
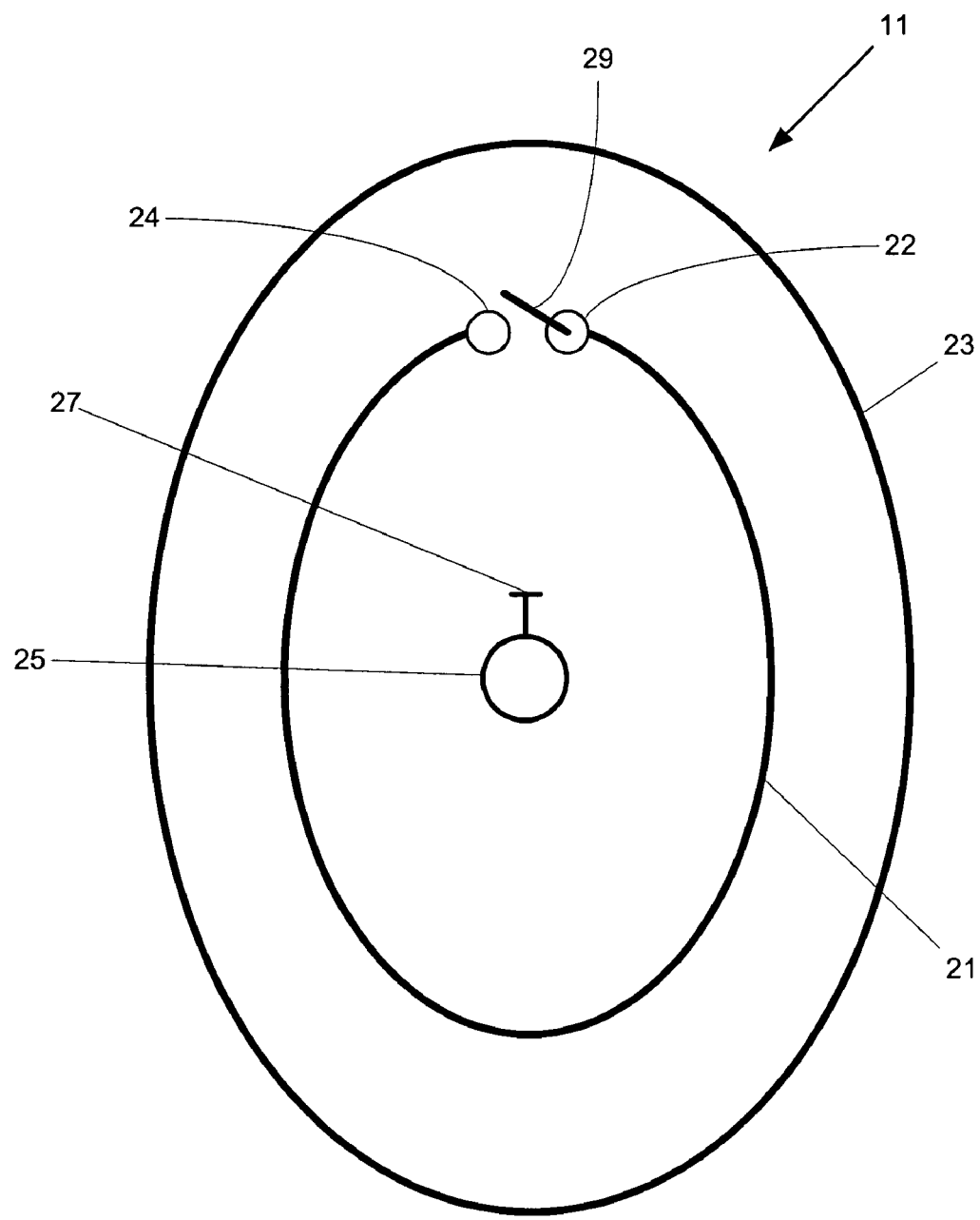
FIG. 2 is an illustration of a test loop according to one embodiment of the invention.

FIG. 2 illustrates one embodiment of a TTL 11 for calibrating an EM logging tool according to the invention. The TTL 11 comprises an elliptical test loop 21 disposed on a support 23. The test loop 21 can be made of any suitable conductive material in any dimension so long as its impedance (inductance/resistance) is discernable (e.g., metal or conductive alloys). The loop 21 may be disposed on (or affixed to) the support using any suitable techniques known in the art. The loop 21 can also be disposed on the support 23 surface or embedded therein. The support 21 can be made of any suitable material with low conductivity (e.g., plastic, epoxy, or fiber glass). The conductive loop 21 may be a simple loop (not shown). The conductive loop 21 shown in FIG. 2 includes a breaker 29 that allows the conductive path in the loop to be interrupted. Those skilled in the art will appreciate that other equivalent devices may be used instead of the breaker 29. For example, the conductive loop 21 may terminate at ends 22 and 24, and a jumper (not shown) may be used to complete the conductive path when desired. The ability to break the conductive loop 21 is useful with embodiments having multiple loops provided on a single support 23. The ability to open and close the conductive loop 21 also facilitates simple quality checks of an EM tool in the field.

The TTL 11 embodiment of FIG. 2 includes an opening or passage 25 formed at (or near) the support 23 center to allow the support 23 to slide over an EM logging tool for calibration, as illustrated in FIG. 1. A screw 27 (or any similar fastening or gripping device) is provided around the rim of the passage 25 so that the support can be fixed at a desired position on the EM tool. In one embodiment, the conduit that forms the passage 25 may be tilted at a selected angle relative to the plane of the support 23 (not shown) such that when the support 23 is disposed on the EM tool, the conductive loop 21 is disposed at the desired tilt angle. In another embodiment, the loop may be split with a hinge at one end so that it can be opened, placed over the tool and then closed. In yet another embodiment, the passage 25 may be pivotally connected to the support 23 such that the tilt angle between the conductive loop 21 and the EM tool may be adjusted after the support 23 is disposed on the EM tool (not shown). The support 23 and/or passage 25 structure can be adapted to provide the desired pivoting using any suitable techniques known in the art (e.g., using a gimbal configuration). In any of the configurations, the loop may be rotated about the axis of the tool so that measurements can be made at different angles in order to excite different couplings.

Embodiments of the invention are not limited to how the TTL 11 is constructed. For example, in some embodiments, the TTL 11 may comprise multiple sections for ease of transport and installation (not shown). In some embodiments, a support 23 can include more than one loop 21, each having a different diameter and impedance such that a single TTL 11 may be used for various EM tools having different separations between the transmitter and the receiver antennas (not shown). If multiple loops are provided on a single support 23, each conductive test loop 21 can include a breaker 29 so that the loops 21 that are not in use can be opened to prevent mutual induction.

After manufacture, an EM tool is initially calibrated in a procedure referred to as a master tool calibration. The master tool calibration is typically performed at the point of manufacture or in a laboratory. Once the EM tool passes the initial (master) calibration, it is sent to the job site, where additional testing or calibration may be performed before and/or after a logging operation to ensure that the log data are reliable. This additional test or calibration is referred to as field calibration. Embodiments of the invention are applicable to both master tool calibration and field calibration.

The logging tool 10 shown in FIG. 1 is equipped with a TMD receiver antenna 14 and an LMD transmitter antenna 13. This particular configuration is for illustration only. It will be understood that embodiments of the invention are not limited to any particular transmitter-receiver configuration. The EM logging tool 10 is also typically suspended above the ground 18 during calibration, such as on tool stands 15. In other embodiments the tool 10 may be suspended vertically from a crane (not shown), or in any other suitable setup. The particular setup for calibrating the EM logging tool 10 is immaterial to the invention.

Figure 3:
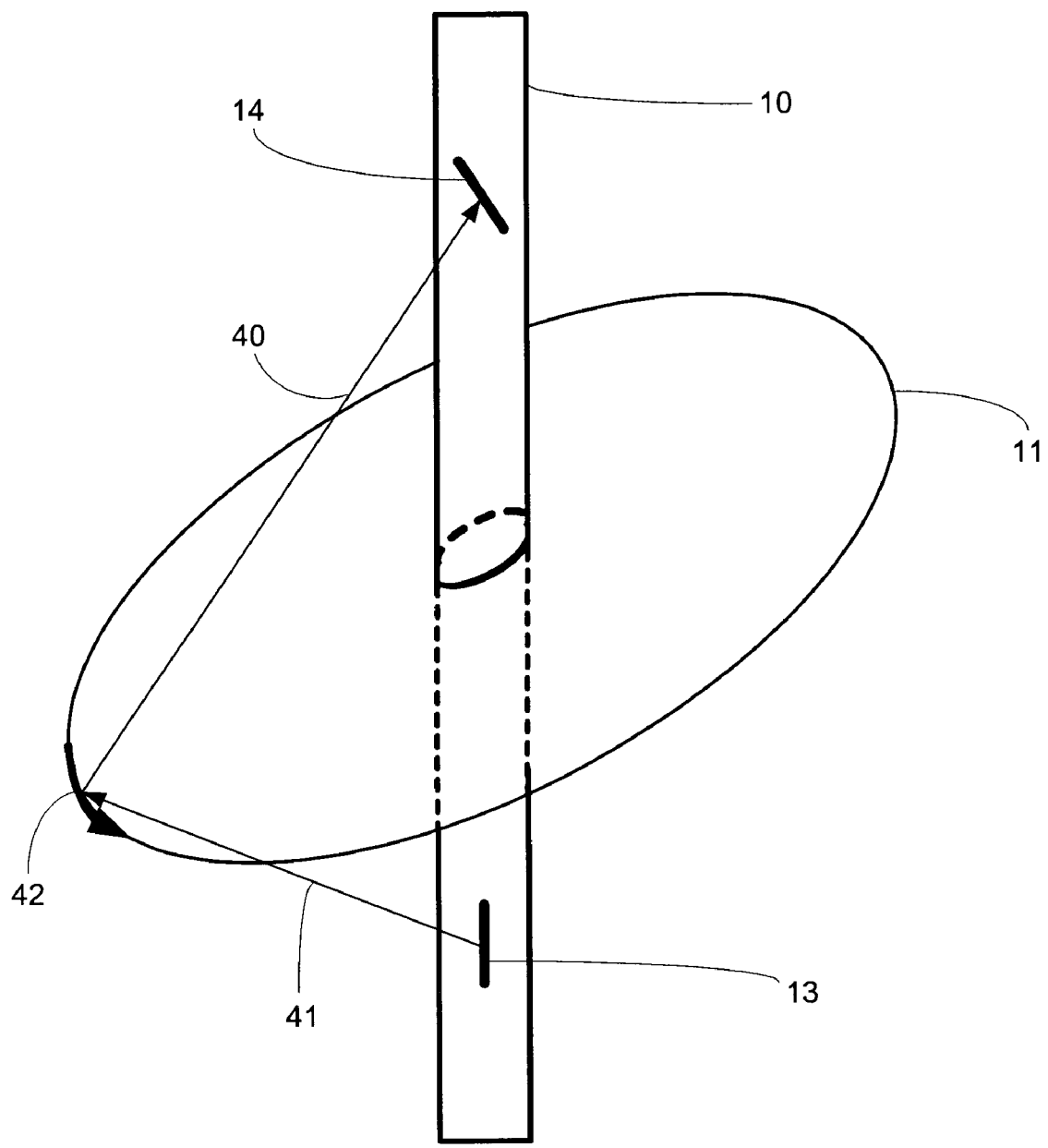
FIG. 3 is an illustration of a transmitter to receiver coupling induced by the test loop in accord with the invention.
Figure 3A:
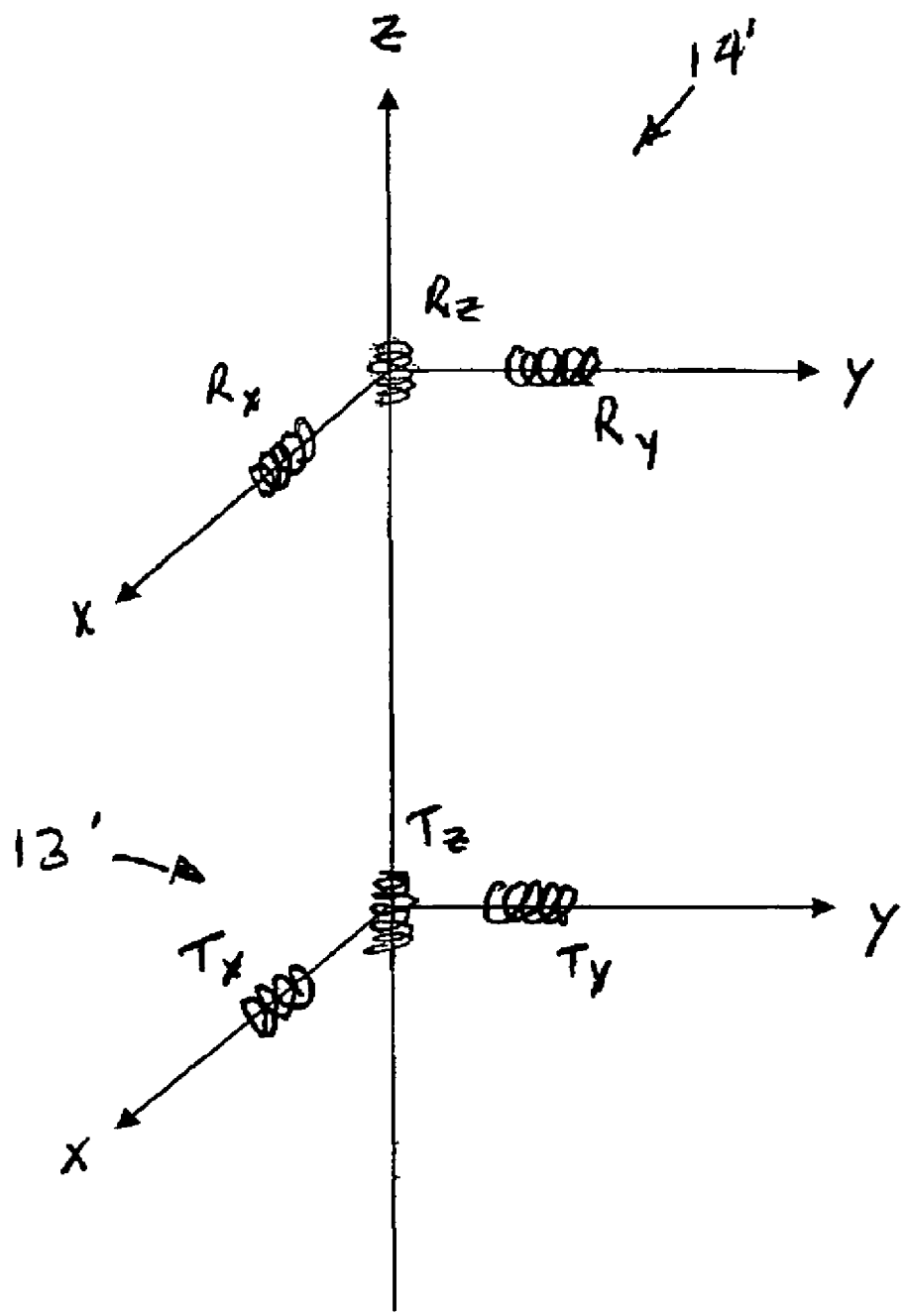
FIG. 3A is a simplified representation of an alternative embodiment employing antennas having a set of coils having mutually orthogonal, non-parallel axes.

FIG. 3 illustrates the EM coupling that takes place during a calibration process according to an embodiment the invention. When the transmitter 13 is energized, it emits EM energy (shown as arrow 41) into the surroundings. The emitted energy induces an eddy current 42 in the TTL 11. The induced current 42 in the TTL 11 produces a secondary EM field in the surroundings. This secondary EM field in turn induces a signal (Note: signal and voltage are interchangeable as disclosed herein) in the receiver antenna 14 via a coupling between TTL 11 and the receiver antenna 14 (shown as arrow 40). The voltage induced in the receiver antenna 14 is recorded. The recorded voltage (or apparent conductivity) is then compared with a calculated voltage based on a model including the coupling effect of the TTL. Signals induced at the receiver antenna due to background effects are accounted for in the voltage comparison.

In another embodiment, a second measurement is made with the TTL 11 removed or with the conductive loop 21 opened (via the breaker 29). The voltage thus detected in the receiver antenna 14 is recorded and compared with that obtained in the presence of the TTL coupling. The difference in the voltages recorded in the receiver antenna 14 in these two operations reflects the coupling effects of the TTL 11. This alternative approach, though requiring two measurements, is simple because tool errors and temperature dependent effects cancel out in the voltage difference. This difference measurement approach is suitable for testing where a quality control check is desired.

As noted above, because the impedance of the TTL 11 is known, it is possible to model this coupling effect using any suitable analytic code algorithm. For example, software sold under the trade name of ELMOD™ by Dynatest Consulting, Inc. (Ventura, Calif.) may be used for such modeling. In such modeling, the antennas may be approximated as point dipoles for simplicity of computation where the TTL 11 diameter is much greater than the antenna diameter. Alternatively, more accurate codes which include the details of the coil and test loop design may be used. The modeled coupling effect and the detected voltage are compared to see whether the EM logging tool 10 functions properly or if a correction needs to be applied. To make corrections, the measured voltage difference is compared with the calculated voltage response to determine a gain (or calibration factor) for the particular tool.

The preceding describes basic calibration procedures according to embodiments of the invention. Those skilled in the art will appreciate that the magnitude of the TTL 11 coupling effect is affected by the TTL location about the EM logging tool 10 and its orientation around the tool. However, calibration according to embodiments of the invention is based on a comparison between measured voltage differences and modeled coupling effects. Therefore, if the modeling is based on a similar TTL location and orientation as the test setup, then it is not overly critical where and how the loop is arranged on the tool 10 as long as there is a measurable effect due to the presence of the TTL. Nevertheless, when the TTL is disposed at a location and in an orientation that produces a maximal coupling effect, the difference in the measured voltages can be more accurately determined and errors produced by errors in the position of the test loop will be minimized. The location of the TTL 11 on the logging tool 10 refers to a distance from the transmitter antenna 13 or the receiver antenna 14, while the orientation of the TTL 11 on the tool 10 refers to its orientation about the X-Y plane if the tool axis is aligned with the Z-axis.

Using an elliptical TTL 11 disposed at 45 degrees to the tool axis as an example and referring to FIGS. 1 and 3, a method for positioning a TTL according to one embodiment of the invention is as follows. To calibrate the TTL coupling between a transmitter in the X direction and a receiver in the X direction, the TTL 11 is disposed on the tool 10 at a first position between the transmitter 13 and receiver 14 with the major axis of the elliptical TTL 11 aligned in the X direction. The transmitter antenna 13 in the X direction is energized and the induced voltage is measured and recorded at the receiver antenna 14 in the X direction. The position (location/orientation) of the TTL 11 about the EM logging tool 10 may be varied and measurements are made in order to find a position where a relative extrema (i.e., maximal coupling) results in the receiver antenna 14. The variation in voltage will have a $\cos\theta$ dependence, where $\theta$ is the rotational angle between the axis of the test loop and the x-axis.

Similarly, to calibrate the coupling between the X transmitter and the Y receiver, the TTL 11 can be oriented halfway (45 degrees) between the X and Y directions and moved along the tool 10 to lace it at an optimal position to produce a relative extrema in the recorded voltage. The variation in voltage will have a $\sin(2\theta)$ dependence, where once again, $\theta$ is the rotational angle between the axis of the test loop and the x-axis. One skilled in the art will appreciate that the other cross terms between the transmitter 13 and receiver 14 may be calibrated in a similar manner.

Figure 4:
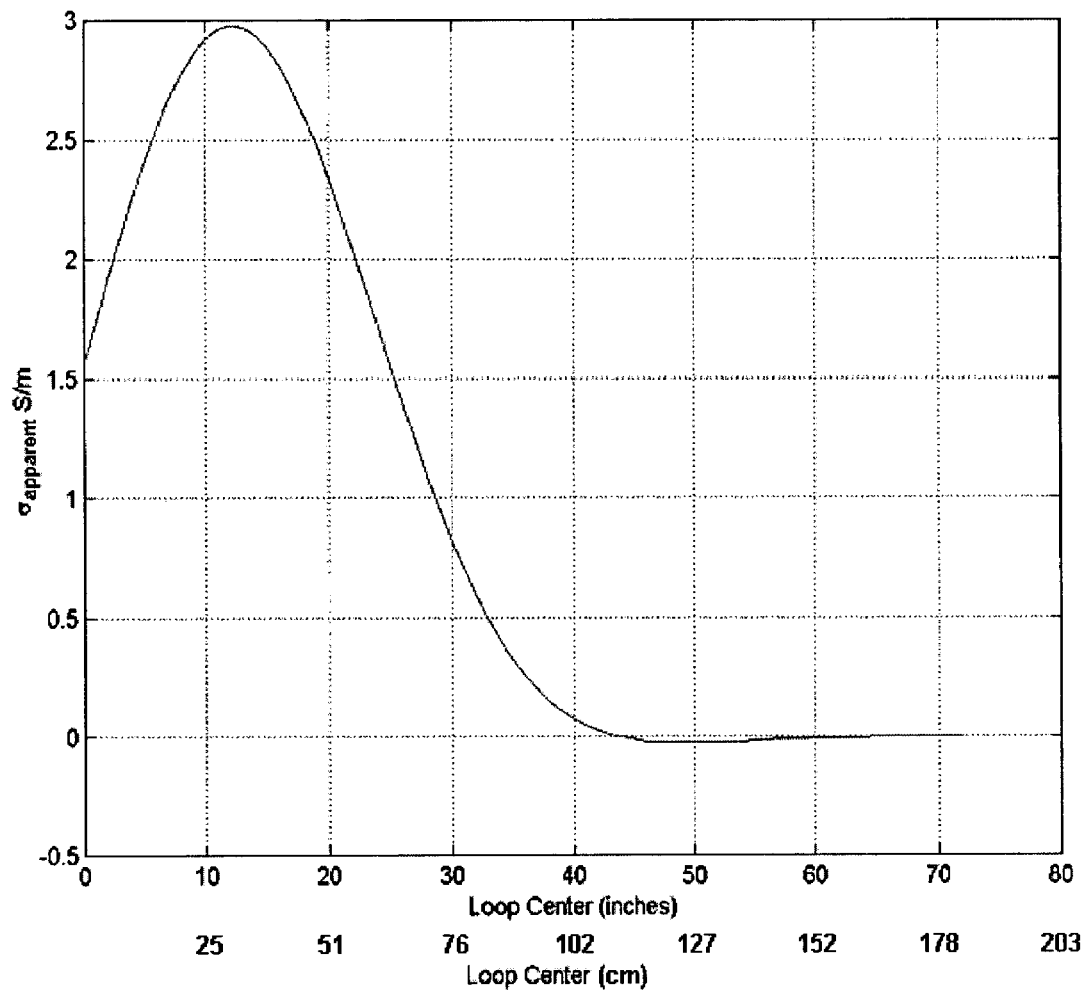
FIG. 4 is a plot of the test loop coupling effects versus a distance between the test loop and the transmitter in accordance with one embodiment of the invention.

FIG. 4 shows an exemplary plot illustrating the effect of TTL locations on its coupling efficiency. The results shown were obtained using a 48 inch [122 cm] (the minor diameter) elliptical TTL with a known admittance of 1 S/m at a 45 degree tilt and a tool having two transverse receiver antenna assemblies disposed at 21 inches [53.3 cm] and 15 inches [38.1 cm] from the transmitter. For test loops with another admittance, the apparent conductivity may need to be mathematically corrected for the admittance of the test loop. It is clear that the TTL coupling effect is detectable up to a 40-inch [102 cm] separation between the transmitter and the TTL. However, a maximal coupling effect is found at a separation of about 12 inches [30.5 cm]. While this particular example shows that the location-dependent curve has a single maximum with a positive coupling effect, other TTL and tool combinations may produce a curve having more than one maximum and/or having one or more minimum with negative coupling effects. Because calibration according to embodiments of the invention is based on a comparison between experimentally determined values and modeled values, a negative coupling effect would also be useful for EM tool calibration in accordance with embodiments of the invention. It is evident from FIG. 4 that the curves are very broad, with the local maximum (or local minimum) readily apparent.

An embodiment of a calibration process of the invention involves computing calibration coefficients in a tensor that couples the transmitter to the receiver. A process for computing these coefficients follows:

If a transmitter has effective magnet moments $$T = \begin{pmatrix} T_1 \\ T_2 \\ T_3 \end{pmatrix}$$

and a receiver has effective moments $$R = \begin{pmatrix} R_1 \\ R_2 \\ R_3 \end{pmatrix},$$

then the voltage V induced in the receiver by an activation of the transmitter with a current I is as follows:

$$\rho = \frac{V}{I} = \sum_{i,j} T_i Z_{ij} R_j = T^T Z R \qquad (1)$$

where Z is a trans-impedance matrix that includes information related to what the tool is capable of measuring about its environment (e.g., the test loop or the earth formation). The element $Z_{ij}$ is the voltage that would be induced in a receiver having an area of 1 m² and a magnetic moment orient in the j direction by passing a current of 1 amp into a transmitter having an area of 1 m² and a magnetic moment oriented in the i direction.

The technique described above is for the simple case. Another approach that may be used for the general case, e.g., for a tri-axial antenna configuration where all the cross couplings are desired and it is assumed the antennas are not orthogonal or misaligned, T, R, and V not each have three columns:

$$T = \begin{pmatrix} T_{11} & T_{12} & T_{13} \\ T_{21} & T_{22} & T_{23} \\ T_{31} & T_{32} & T_{33} \end{pmatrix}, R = \begin{pmatrix} R_{11} & R_{12} & R_{13} \\ R_{21} & R_{22} & R_{23} \\ R_{31} & R_{32} & R_{33} \end{pmatrix} \text{ and}$$

$$V = \begin{pmatrix} V_{11} & V_{12} & V_{13} \\ V_{21} & V_{22} & V_{23} \\ V_{31} & V_{32} & V_{33} \end{pmatrix},$$

and equation (1) becomes $$\rho_{ij} = \frac{V_{ij}}{I_i} = \sum_{k,l} T_{ki} Z_{kl} R_{lj} \qquad (2)$$

$$\rho = T^T Z R$$

From this, the tensors describing the transmitter (T) and receiver (R) may be inverted to give:

$$Z = (T^{-1})^{TP} R^{-1} \qquad (3)$$

The calibration process can now be expanded from the computation of a single calibration coefficient for a conventional LMD tool to the computation of multiple entries in the matrices T and R for a TMD tool. Each time a measurement is made with a TTL in a direction position or orientation, the trans-impedance matrix Z changes and a different measurement $\rho$ is obtained. By having a set of different measurements (with different TTL positions or orientations), it becomes possible to estimate the values of tensors T and R.

Thus, to estimate the calibration coefficients, a set of measurements for generating different trans-impedance matrices Z are obtained together with the corresponding set of measured values of $\rho$ (in Equation 2). The set of trans-impedance matrices Z and measured values $\rho$ are then used to solve for tensors T and R, using a nonlinear least squares technique to minimize the difference between the measured and expected values. Because these measurements include a product of transmitter moments and receiver moments, it is possible to scale the transmitter moments by a factor a, provided that the receiver moments are scaled by 1/a. The result is a calibration that accounts for both the errors in magnitude and phase of each measurement, and also for the fact that the coils are not mechanically perfect.

In formation logging, it is typical to present the measured voltages (or induced signals) in terms of apparent formation conductivity. Because the measured voltages in the receiver antennas directly correlate with the formation conductivity, the apparent formation conductivity may be simply presented as a scaled version of the voltage measured by the tool. In 1962, Moran and Kunz showed that, in a homogeneous isotropic formation, the voltage detected in an axial receiver antenna following excitation of an axial transmitter antenna is as follows:

$$V = I\frac{i\omega\mu(A_T A_R)(TR)}{2\pi L^3}(1 - ikL)e^{ikL} \quad (4)$$

where $A_T$ and $A_R$ are the effective areas of the transmitter and receiver, respectively, T and R are the number of turns for the transmitter and the receiver, respectively, L is the distance between the transmitter and the receiver, and the propagation constant $$k = \sqrt{i\omega\mu\sigma} = \frac{1+i}{\delta},$$

where $\omega$ is the frequency of the alternating current, $\sigma$ is the conductivity, $\mu$ is the magnetic permeability of the formation, and $$\delta = \sqrt{\frac{2}{\omega\mu\sigma}}$$

is the skin depth in the medium. The voltage expressed in Equation (2) is a complex number because it is phase-shifted from the phase of the transmitter current I. Its real and imaginary components are referred to as the resistive signal (R-signal) and reactive signal (X-signal). Equation (4) may be expanded as powers of s to produce:

$$-V_R = K\sigma\left(1 - \frac{2L}{3\delta} + \cdots\right) \quad (5)$$

$$V_X = K\sigma\frac{\delta^2}{L^2}\left(1 - \frac{2L^3}{3\delta^3} + \cdots\right)$$

$$K = \frac{(\omega\mu)^2 A_T A_R TR}{4\pi L}I$$

where $V_R$ is the R-signal, $V_X$ is the X-signal, and K is a factor that correlates the measured voltage with the formation conductivity.

For a multi-antenna sonde, $$\sigma_a = -\frac{V_R}{K} \quad (6)$$

where $$K_{zz} = \sum_{i,j} \frac{(\omega\mu)^2 (A_{T_i} A_{R_j})(T_i R_j)}{4\pi L_{ij}}I \quad (7)$$

For a set of transverse antennas, equation (4) becomes:

$$V = I\frac{i\omega\mu(A_T A_R)(TR)}{4\pi L^3}(-1 + ikL + k^2 L^2)e^{ikL} \quad (8)$$

Following the same transformation as described above, $K_{xx}$ and $K_{yy}$, which are identical, may be obtained as:

$$K_{xx}, K_{yy} = \sum_{i,j} \frac{(\omega\mu)^2 (A_{T_i} A_{R_j})(T_i R_j)}{8\pi L_{ij}}I \quad (9)$$

The difference in normalization ensures that in a low conductivity homogeneous isotropic medium, $$\sigma_{xx} = \sigma_{yy} = \sigma_{xx} \quad (10)$$

which is what it should be. Using these factors (Kxx, Kyy, and Kzz) the measured voltages can then be converted to more familiar apparent conductivity: $\rho = V/K$.

As noted above, if the measured response is different from the calculated response based on a model, the tool response may need to be adjusted by a gain/phase. According to one embodiment of the invention, a gain correction may be found by solving the gain matrix G:

$$TZ_{TTL}^{Meas}R^T = V_{TTL}^{Calc}, \quad (11)$$

where $$Z_{TTL}^{Meas}$$

is the measured TTL response less a background measurement and $$V_{TTL}^{Calc}$$

is the calculated TTL response or trans impedance.

Figure 5A:
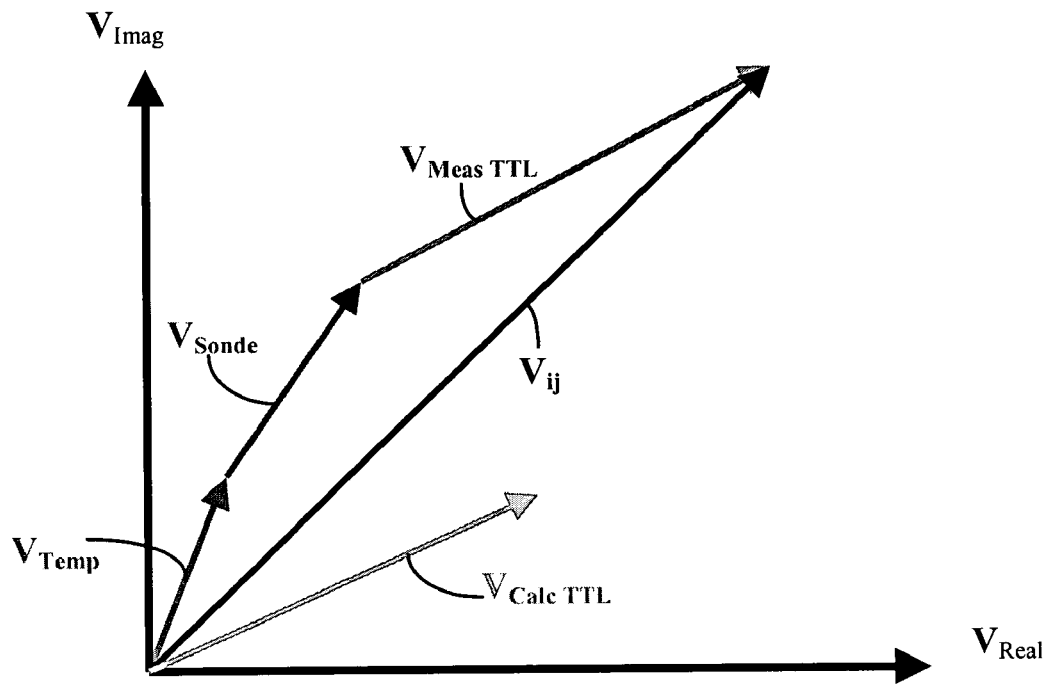
FIGS. 5a and 5b show vector diagrams illustration corrections for sonde error and temperature-dependent effects in accordance with one embodiment of the invention.
Figure 5B:
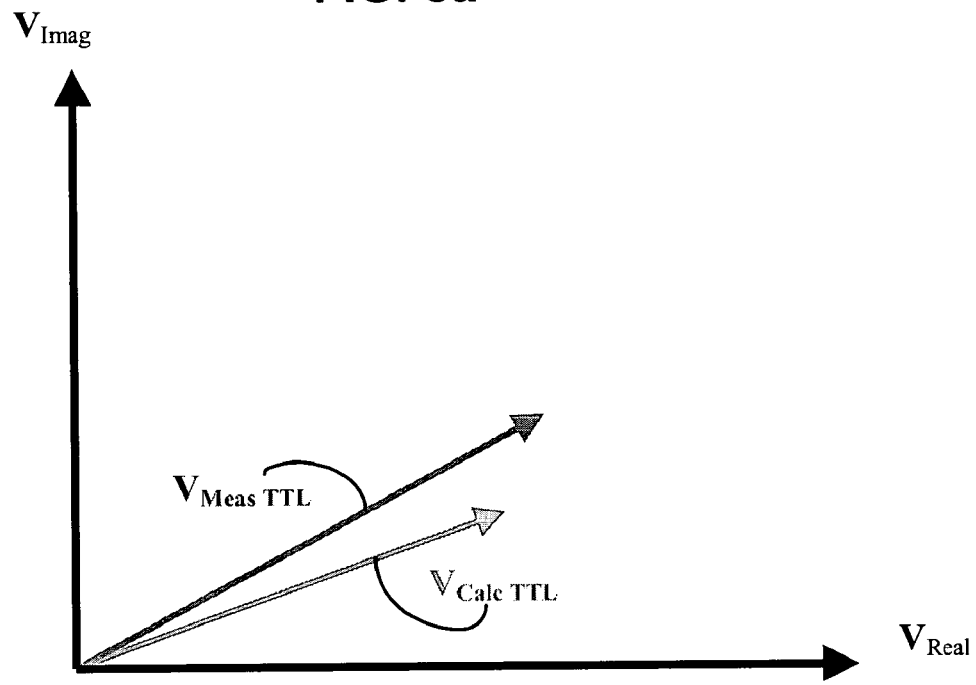

The process of deriving a gain correction factor may be better understood using illustrations of vector diagrams. FIGS. 5a–5b show two charts with vector illustrations of the TTL response vector $V_{ij}$, where i or j={x,y,z}. FIG. 5a shows a vector voltage diagram of the total $V_{ij}$ measurement that includes contributions from array temperature-dependent effect ($V_{Temp}$) and sonde error ($V_{sonde}$). FIG. 5b shows the measurement ($V_{Meas\ TTL}$) with the temperature and sonde error contributions removed. The corrected measurement ($V_{Meas\ TTL}$) is then compared with the calculated TTL response ($V_{Calc\ TTL}$) to provide a gain/phase correction factor. Finally, a calibrated tensor voltage $V^{Calibrated}$ is defined as:

$$V^{Calibrated} = TZ^{Meas}R^T - V_{sonde} - V_{Temp}(T), \qquad (12)$$

where $V_{sonde}$ represents a sonde error and $V_{Temp}$ represents a temperature dependent voltage to correct for temperature drift in the tool response. Techniques for deriving the tool sonde error are known in the art. U.S. Pat. No. 4,800,496 describes a technique that can be used to correct for sonde error. Temperature-dependent voltage effects are also derived by techniques known in the art, such as by creating a voltage versus temperature table.

Figure 6:
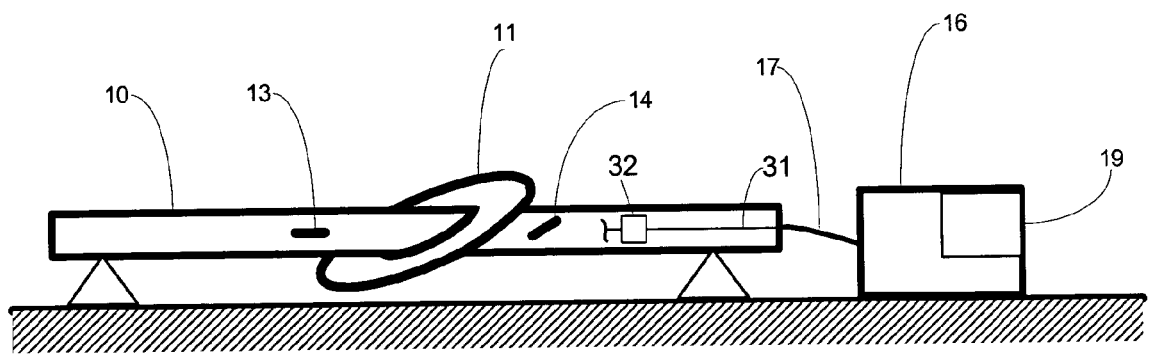
FIG. 6 is an illustration of a logging tool with a test loop disposed about the tool axis for calibration in accord with the invention.

Embodiments of the invention provide convenient methods to ensure that an EM tool delivers high quality measurements every time it is run in a well. In order to ensure proper tool function, subsequent to the initial tool calibration, a calibration check may be performed at any time. FIG. 6 illustrates an embodiment of the invention that allows for a convenient field calibration that may be performed with minimal user intervention. To perform the calibration check (or field calibration), the transmitter antenna 13 is energized and the TTL 11, disposed about well logging tool 10, couples the transmitter antenna 13 and the receiver antenna 14. This coupling induces a voltage signal at the receiver antenna 14, which is recorded.

A calibration process of the invention can be summarized as follows. A TTL is disposed about an EM logging tool between the selected transmitter-receiver. As noted above, any sized TTL may be used as long as it produces measurable effect on the transmitter-receiver coupling. Similarly, the shape of the TTL is not a limiting factor. To calibrate TMD tools, the TTL is disposed at a tilt angle relative to the axis of the tool. This tilt angle can be anywhere between about 0 to about 90 degrees, depending on the orientation of the transmitter and/or receiver antennas involved. Furthermore, although the TTL can be disposed in a manner such that the center of the loop is at or near the axis of the tool, this is not necessary. The invention may be implemented with the TTL disposed off centered, or even completely to one side of the tool. The criterion is that the TTL be disposed at a location to produce measurable effects.

Next, the transmitter antenna is energized. This can be accomplished with the electronic and power modules that are normally used to power the tool as known in the art. A voltage (or signal) induced at the receiver antenna is then detected or recorded. The induced signal/voltage at the receiver antenna includes a portion that would be detected in the absence of the TTL and a portion that is contributed by the TTL coupling. This induced signal/voltage can also include voltage due to sonde errors or other environmental factors.

A tool sonde error correction, temperature drift correction, or any other environmental effect correction can then be applied to the measured induction signal/voltage as known in the art. This approach may be preferred in field calibration where one is interested in determining whether the tool is performing within a preset error tolerance. For this correction, sonde error and temperature correction factors may be pre-stored in a memory, which may be included in the tool or induced in an independent computer. An alternative approach to correcting the measured induction signal/voltage is to take a second measurement in the absence of the TTL coupling and to derive a difference signal/voltage from the first and the second measurements. The "difference signal/voltage" thus obtained would cancel out all effects (including environmental effects) not due to the presence of the TTL. Therefore, this alternative approach may be preferred for the initial (master) tool calibration. The measurement in the absence of the TTL coupling effect can be obtained in more than one way: with the TTL removed from the tool or with the TTL remaining on the tool but the conductive loop open. Whether the measured induction signal/voltage is corrected by applying correction factors or by a difference signal/voltage, the resultant signal/voltage is generally referred to as a corrected signal (or a corrected voltage).

The corrected voltage is then compared to a calculated voltage. As noted above, the calculated voltage may be obtained from modeling of the system. The model would include the characteristics of the TTL, the tilt angle, its position on the tool, and the characteristics of the tool. The modeling may be accomplished with any suitable algorithm known in the art.

In some embodiments, a gain may be determined. The gain matrix can be derived from a comparison of the magnitudes of the corrected voltage and the calculated voltage matrix. The gain thus obtained can then be used to normalize the magnitude/phase of the corrected voltage such that it would produce an accurate value. In general, the gain matrix is complex, that is, it corrects for the fact that the measured voltage differs from the nominal voltage both in its magnitude and in its phase. The process steps outlined above are illustrative embodiments. Those skilled in the art will appreciate the other variations are possible without departing from the scope of the invention.

Figure 7:
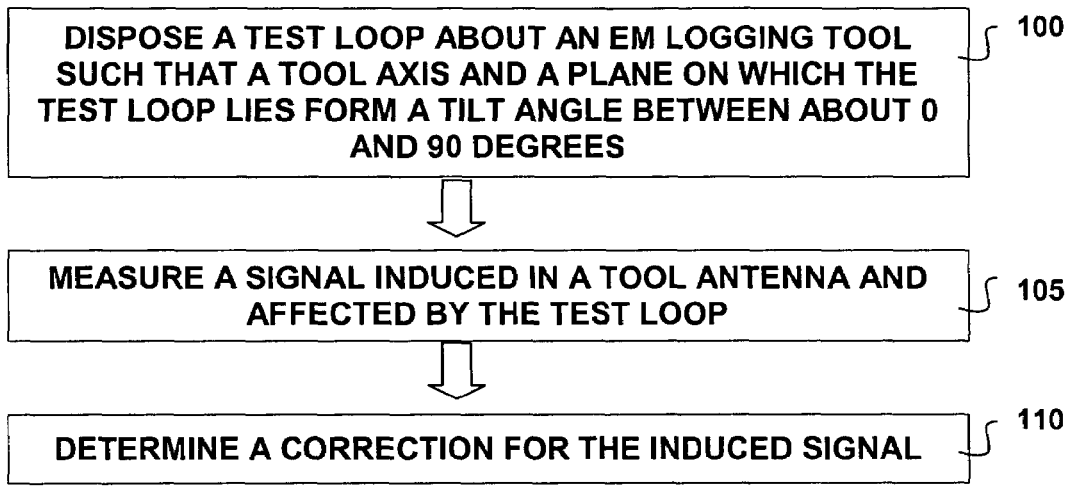
FIG. 7 is a flow diagram of a calibration process in accord with the invention.

FIG. 7 illustrates a calibration process according to an embodiment of the invention. First, a test loop is disposed about the electromagnetic logging tool such that the axis of the tool and a plane on which the test loop lies form a tilt angle that is between about 0 and 90 degrees (shown as 100). A signal induced in one of the antennas is then measured when another of the antennas is energized, the induced signal being affected by the test loop (shown as 105). A correction for the induced signal is then determined (shown as 110).

The EM tool may be implemented with hardware and circuitry 32 to record and store signal data including a previously determined sonde errors and temperature dependent effects (temperature may be measured by a senor inside the tool 10) for measurement correction. Data is communicated to the circuitry 32 along wire 31, which can be coupled to a processor unit 16. The previously described gain correction may be performed by the circuitry 32 or the processor unit 16. Corrected voltage data can be multiplied by a gain matrix, which may be determined during the initial or master tool calibration. The corrected voltage, either before or after gain correction, can be compared with a predefined value to see if it falls within a selected range of tolerance for maintaining a desired quality assistance. The range of tolerance may be based on the particular TTL selected and the transmitter 13 to receiver 14 spacing.

Embodiments of the invention may be implemented in a program storage device readable by a processor. The program storage device includes a program that encodes instructions for performing the operations described herein. FIG. 6 shows a program storage device 19, which may take the form of, for example, one or more floppy disks, a CD-ROM or other optical disk, a magnetic tape, a read-only memory chip (ROM) or other forms of the kind that would be appreciated by one of ordinary skill in the art. The program of instructions may be encoded as "object code" (i.e., in binary form that is executable more-or-less directly by a computer), in "source code" that requires compilation or interpretation before execution or in some intermediate form such as partially complied code.

Advantages of the invention include efficient methods for the calibration of EM logging tools having tilted or transverse antennas. The apparatus and methods of the invention may be conveniently used both in master tool calibration and field calibration. In field application, the invention provides a convenient ways to check a TMD tool before and/or after a logging operation to ensure that the log data are reliable.

While the invention has been described with respect to a limited number of embodiments, those skilled in the art, having benefit of this disclosure, will appreciate that other embodiments can be devised which do not depart from the scope of the invention. For example, while the previous description assumes the calibration is performed in the air, it will be understood that the modeling/calibration may also be performed in other media. The TTL may also be implemented in virtually any shape (e.g., circle, triangle, square, ellipse, etc).

What is claimed is:

1. A method for calibrating an electromagnetic logging tool having a plurality of antennas disposed thereon with at least one antenna having its axis at an angle with respect to the axis of the tool, each antenna being configured to transmit and/or receive electromagnetic energy, comprising the steps of:
   (a) disposing a test loop about the electromagnetic logging tool such that the axis of the tool and a plane on which the test loop lies form a tilt angle that is between about 0 and 90 degrees;
   (b) measuring a signal induced in one of said antennas when another of said antennas is energized, the induced signal being affected by the test loop;
   (c) determining a correction for the induced signal, including producing a corrected signal and comparing the corrected signal with a calculated signal based on a model including the electromagnetic logging tool and the test loop; and
   (d) further comprising deriving a gain or phase factor by comparing the corrected signal with the calculated signal.

2. The method of claim 1, wherein step (c) includes applying to the induced signal a correction selected from a group consisting of a sonde error correction and temperature correction.

3. The method of claim 1, further comprising:
   altering a position of the test loop about the electromagnetic logging tool and repeating steps (b) to (c).

4. The method of claim 1, further comprising deriving calibration coefficients for at least one of the antennas.

5. The method of claim 1, wherein the tilt angle is 45 degrees.

6. The method of claim 1, wherein at least one of the antennas comprises a plurality of coils having mutually orthogonal axes.

7. The method of claim 1, wherein at least one of the antennas comprises a plurality of coils having non-parallel axes.

8. The method of claim 1, wherein the at least one antenna having its axis at an angle comprises a transverse antenna.

9. The method of claim 1, further comprising multiplying the corrected signal by gain or phase factors.

10. The method of claim 1, wherein step (c) includes determining a maximum or minimum values associated with the measured signal.

11. The method of claim 1, wherein step (b) includes rotating the test loop about the axis of the tool.

12. The method of claim 1, wherein step (b) includes displacing the test loop off the axis of the tool.

13. A system for calibrating an electromagnetic logging tool, comprising:
   a plurality of antennas disposed on the logging tool with at least one antennas having its axis at an angle with respect to the axis of the tool, each antenna being configured to transmit and/or receive electromagnetic energy;
   a test loop positionable about the logging tool such that the axis of the tool and a plane on which the test loop lies form a tilt angle that is between about 0 and 90 degrees; and
   a processor configured to calculate a correction for a measured signal induced in one of the plurality of antennas by another the plurality of antennas, the induced signal being affected by the test loop, wherein the processor is further configured to calculate the correction using a second measured signal induced at the one of the plurality of antennas without any effect associated with the test loop.

14. The system of claim 13, wherein the tilt angle is 45 degrees.

15. The system of claim 13, wherein at least one of the antennas comprises a plurality of coils having mutually orthogonal axes.

16. The system of claim 13, wherein at least one of the antennas comprises a plurality of coils having non-parallel axes.

17. The system of claim 13, wherein the at least one antennas having its axis at an angle comprises a transverse antenna.

18. The system of claim 13, wherein the processor is configured to apply to the induced signal a correction selected from the group consisting of a sonde error correction and temperature correction.

19. The system of claim 13 wherein the test loop comprises a conductive loop having means for selective opening or closing of said loop.

20. The system of claim 13, wherein the processor is configured to produce a corrected signal and to compare the corrected signal with a calculated signal.

21. The system of claim 20, wherein the processor is configured to derive a gain or phase factor by comparing the corrected signal with the calculated signal.

22. The system of claim 20, wherein the processor is configured to multiply the corrected signal by gain or phase factors.

23. The system of claim 20, wherein the calculated signal is based on a model including the electromagnetic logging tool and the test loop.

24. The system of claim 13, wherein the processor is configured to derive calibration coefficients for at least one of the antennas.

25. The system of claim 13, wherein the calculation for the induced signal correction includes determining a maximum or minimum value associated with the induced signal.

26. The system of claim 13, wherein the test loop is positionable for rotation about the axis of the tool.

27. The system of claim 13, wherein the test loop is configured for displacement off the axis of the tool.

28. A system for calibrating an electromagnetic logging tool having a plurality of antennas disposed thereon with at least one antenna having its axis at an angle with respect to the axis of the tool, each antenna being configured to transmit and/or receive electromagnetic energy, comprising:

a test loop positionable about the logging tool such that the axis of the tool and a plane on which the test loop lies form a tilt angle that is between about 0 and 90 degrees;

a computer connectible to the electromagnetic logging tool, wherein the computer is configured to process a program with instructions to perform;

energizing a first antenna on the tool in the presence of the test loop;

measuring an induced signal at a second antenna on the tool; and determining a correction for the induced signal, wherein determining the correction for the induced signal includes using a signal induced at the second antenna with the test loop open.

29. The system of claim 28, wherein at least one of the antennas comprises a plurality of coils having mutually orthogonal axes.

30. The system of claim 28, wherein at least one of the antennas comprises a plurality of coils having non-parallel axes.

31. The system of claim 28, wherein the test loop comprises a conductive loop having means for selective opening or closing of said loop.

32. The system of claim 28, the program including further instructions to determine a corrected signal and to compare the corrected signal with a calculated signal.

33. The system of claim 28, wherein determining the correction for the induced signal includes determining a maximum or minimum value associated with the induced signal.

34. The system of claim 28, wherein the test loop is rotatable about the axis of the tool.

35. The system of claim 28, wherein the test loop is configured for displacement off the axis of the tool.

* * * * *